United States Patent [19]

Ishiyama et al.

[11] Patent Number: 4,936,555
[45] Date of Patent: Jun. 26, 1990

[54] VIBRATION DAMPING DEVICE

[75] Inventors: Tatsuro Ishiyama, Yokohama; Takao Ushijima, Chigasaki; Toshiyuki Tabata, Yokohama; Toshihiko Aihara, Yokohama; Hajime Takeguchi, Yokohama, all of Japan

[73] Assignees: Bridgestone Corporation; Nissan Motor Co., Ltd., both of Japan

[21] Appl. No.: 386,608

[22] Filed: Jul. 31, 1989

[30] Foreign Application Priority Data

Aug. 2, 1988 [JP] Japan .................................. 63-192990

[51] Int. Cl.$^5$ ............................................. F16F 5/00
[52] U.S. Cl. .................................... 267/140.1; 267/219
[58] Field of Search ................ 248/562; 267/140.1 R, 267/140.1 C, 219

[56] References Cited

U.S. PATENT DOCUMENTS 4,840,357 6/1989 Jouade ............................. 267/140.1

Primary Examiner—Duane A. Reger
Attorney, Agent, or Firm—Oliff & Berridge

[57] ABSTRACT

A bush-type vibration damping device having an inner cylinder and an outer cylinder arranged in such a way that their axes extend in parallel with each other, and an elastic member is interposed between the inner and outer cylinders. A pressure receiving chamber, a first sub-liquid chamber and a second sub-liquid chamber are provided at one side of the inner cylinder. The first sub-liquid chamber has a not smaller resistance to expansion by pressure than the second sub-liquid chamber. The first and second sub-liquid chambers are connected to the pressure receiving liquid chamber through first and second communication passages, respectively. The second communication passage produces a not smaller resistance to flowing liquid than the first communication passage. Vibration of a comparatively low frequency and large amplitude is adsorbed by the flow resistance encountered by a liquid displaced through the second communication passage, while vibration of a comparatively high frequency and small amplitude causes a resonance of the liquid in the first passage so as to limit increase in the dynamic spring constant.

20 Claims, 14 Drawing Sheets

VIBRATION DAMPING DEVICE

BACKGROUND OF THE INVENTION

1. Field of the Invention

The present invention relates to a vibration damping device which has an inner cylinder and an outer cylinder arranged such that their axes extend in parallel with each other, with an intermediary of an elastic member connected therebetween.

2. Description of the Related Art

A vibration damper of a type so-called "liquid-containing bush-type vibration damper" is known. It has an outer cylinder and an inner cylinder arranged such that their axes extend in parallel with each other. This type of vibration damper is used mainly in automobiles, in particular as an engine mount for mounting the engine.

This type of vibration damper has an elastic member disposed between the outer and inner cylinders. The elastic member has a pair of liquid chambers which are connected through a passage having a restriction. Vibration of the engine transmitted to one of the liquid chambers causes the liquid in the liquid chamber to be displaced into the other liquid chamber. The displacement of the liquid encounters a resistance as it flows through the restriction so that the vibration is absorbed.

Shake of automotive engine usually takes place at a frequency range around 10 Hz. The above-mentioned known vibration damper exhibits large attenuation of vibration and, hence has superior vibration damping characteristics in a frequency range around 10 Hz. However, this known vibration damping device exhibits a high dynamic spring constant and reduces the vibration damping effect against engine idling vibration which takes place at a range of 20 to 30 Hz. A vibration damping device also is proposed in which a pressure relief means is provided for relieving the pressure in the liquid chamber so as to effectively absorb the idling vibration of the engine. This type of vibration damping device, however, exhibits an inferior attenuation characteristic in the engine shaking frequency range around 10 Hz.

SUMMARY OF THE INVENTION

Accordingly, an object of the present invention is to provide a vibration damping device which is capable of effectively absorbing both engine shake and engine idling vibration, thereby overcoming the above-described problems in the prior art.

To this end, according to the present invention, there is provided a vibration damping device of the type having an inner cylinder and an outer cylinder which are arranged such that their axes extend in parallel with each other. A pressure-receiving liquid chamber, a first sub-liquid chamber and a second sub-liquid chamber is provided adjacent to one side of the inner cylinder. The pressure-receiving liquid chamber is communicated with the first and second sub-liquid chambers through first and second communication passages. The first and second sub-liquid chambers are respectively provided with chamber expansion and contraction means. The first communication passage produce a flow resistance which is not greater than that produced by the second communication passage. The liquid chamber expansion and contraction means of the first sub-liquid chamber have a resistance to pressure not smaller than that of the second sub-liquid chamber.

According to the present invention, the vibration of a frequency around 10 Hz transmitted from the engine, i.e., engine shake, having an amplitude in the order of ±1 mm, is effectively absorbed by the resistance produced when the liquid flows from the pressure-receiving liquid chamber to the second sub-liquid chamber through the second passage. In this case, since the expansion and contraction means of the first sub-liquid chamber has a comparatively large resistance to pressure, almost no movement of the liquid takes place in the first communication passage which provides communication between the liquid-receiving liquid chamber and the first sub-liquid chamber.

When the engine idles, a vibration of a frequency ranging between 20 and 30 Hz and having an amplitude of ±0.3 mm takes place. When this engine idle vibration is transmitted to the vibration damping device of the invention, the second communication passage is almost completely blocked because it poses a large resistance against the flow of the liquid. Therefore, the liquid from the pressure-receiving liquid chamber resonates in the first communication passage which interconnects the pressure-receiving liquid chamber to the first sub-liquid chamber with the result that the dynamic spring constant is lowered to enable absorption of the engine idle vibration.

DESCRIPTION OF THE PREFERRED EMBODIMENTS

Figure 1:
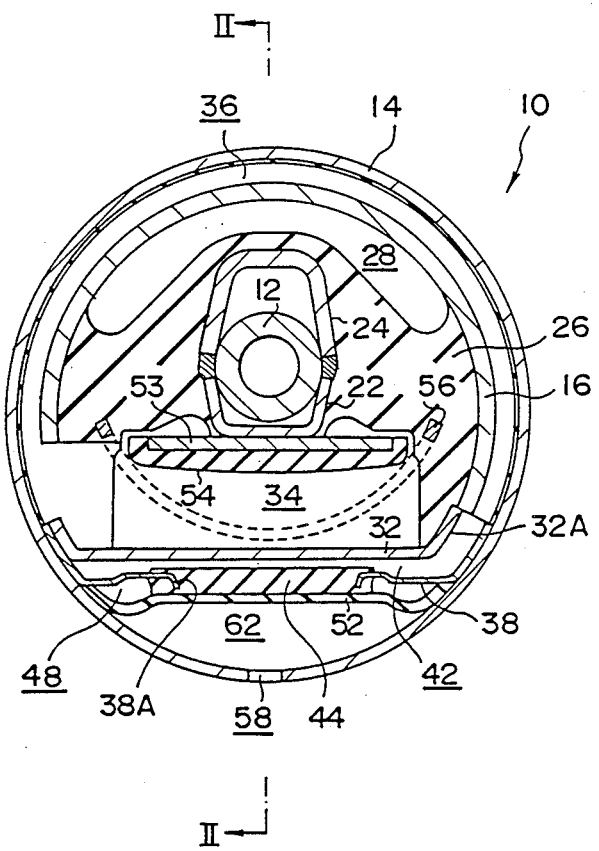
FIG. 1 is a sectional view taken along line I—I of FIG. 2, illustrating a first embodiment of the vibration damping device of the present invention.
Figure 2:
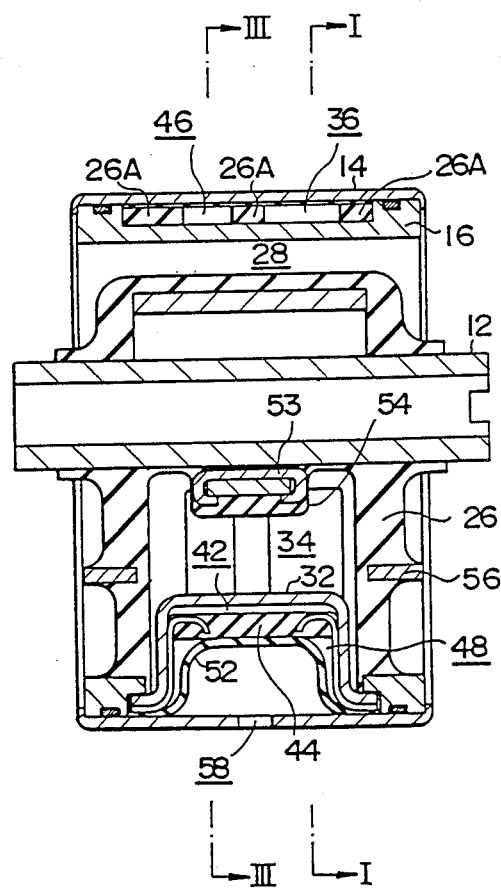
FIG. 2 is a sectional view taken along line II—II of FIG. 1.

FIGS. 1 and 2 show a vibration damping device 10 which is a first embodiment of the present invention.

The vibration damping device 10 has an inner cylinder 12 and an outer cylinder 14 which are arranged such that their axes extend in parallel with each other. The outer cylinder 14 receives an intermediate cylinder 16 which is fixed to the outer cylinder 14 at both axial ends of the cylinders.

As shown in FIG. 1, a pair of substantially U-shaped plates 22 and 24 opposing each other are fixed to the outer periphery of the inner cylinder 12. An elastic member 26 made of an elastic material such as rubber is fixed between the U-shaped plates 22, 24 and the intermediate cylinder 16 by vulcanization. Thus, the elastic member 26 is disposed between the inner cylinder 12 and the outer cylinder 14.

A vacant, through portion 28 is formed in the elastic member 26 at one side of the inner cylinder 12. The portion of the elastic body 26 which is on the opposite side of the inner cylinder 12 and the vacant, through portion 28 is largely recessed towards the inner cylinder 12. A partition plate 32 contacts the inlet of the recess so as to define a pressure-receiving liquid chamber 34. The pressure-receiving liquid chamber 34 communicates with one end of a first communication passage 36 which is formed between the outer cylinder 14 and an annular recess formed on the outer periphery of the intermediate cylinder 16.

The first communication passage 36 communicates at its other end with a first sub-liquid chamber 42 which is defined between the partition plate 32 and another partition plate 38 superposed on the outer side of the partition plate 32, through bent portion 32A of the partition plate 32.

This partition plate 38 is thinner than the partition plate 32 and has a central rectangular opening 38A to which an elastic member 44, such as rubber, is bonded by vulcanization for elastic deformation. This forms an expansion and contraction means for the first sub-liquid chamber 42.

Figure 3:
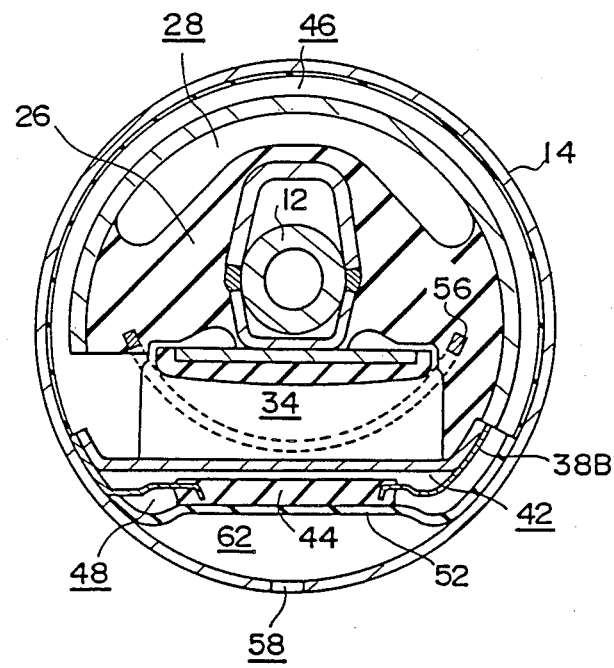
FIG. 3 is a sectional view taken along line III—III of FIG. 2.
Figure 4:
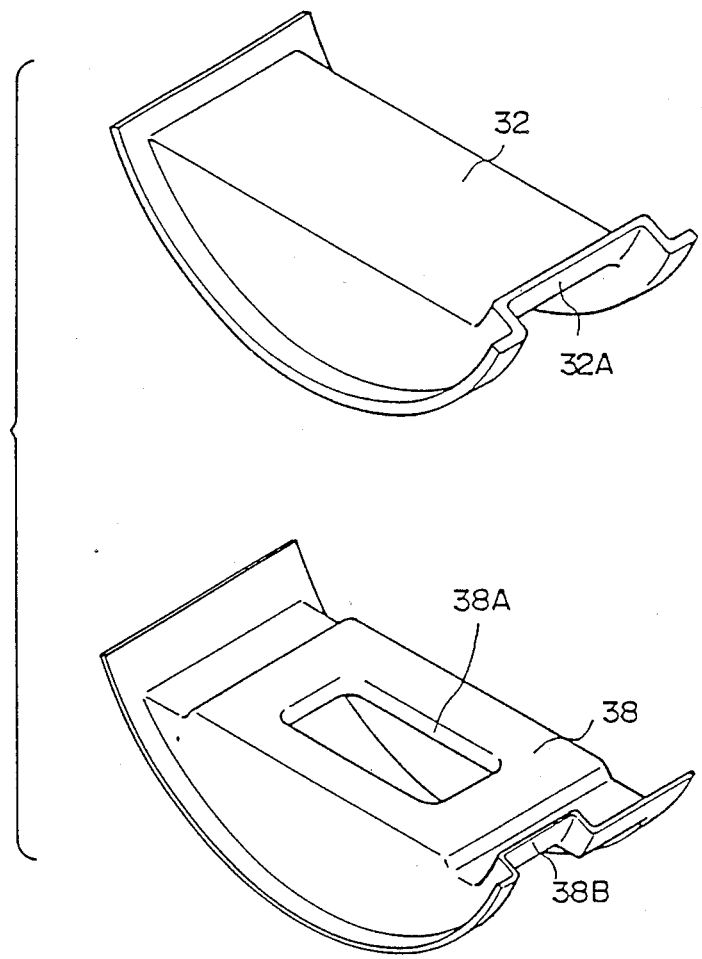
FIG. 4 is a perspective view illustrating a partition plate.

As shown in FIG. 3, the pressure-receiving liquid chamber 34 also communicates with one end of a second communication passage 46 which is formed between the bottom of a recess formed in the outer periphery of the intermediate cylinder 16 and the outer cylinder 14 and which is coaxial and adjacent to the first communication passage 36. The other end of the second communication passage is communicates with a second sub-liquid chamber 48 through a bent portion 38B of the first partition plate 38. The inside diameter and the length of the second communication passage 46 are determined in such a way that it produces a greater resistance to the flowing liquid than the first communication passage 36. As will be seen from FIG. 2, portions 26A of the elastic member 26 extend into the recess in the outer periphery of the intermediate cylinder 16 so as to separate the first and second communication passages 36 and 46 from each other and so as to define axially the outer ends of these passages 36, 46.

The second sub-liquid chamber 48 is defined by the partition plate 38 and a diaphragm 52 which is disposed on the outer side of the partition plate 38 and which is clamped at its outer peripheral edge portion by the intermediate cylinder 16 and the outer cylinder 14. This diaphragm 52 serves as an expansion and contraction means for the second sub-liquid chamber 48, as is the case of the elastic member 44 which serves as the expansion and contraction means for the first sub-liquid chamber 42. The diaphragm 52, however, has a thickness smaller than that of the elastic member 44 and, therefore, is easier to deflect than the elastic member 44. Thus, the second sub-liquid chamber 48 can deform more easily than the first sub-liquid chamber 42. In other words, the first sub-liquid chamber 42 has a greater resistance to pressure than the second sub-liquid chamber 48.

A restraint plate 56, which has a rectangular frame-like cross-section, is embedded in the elastic member 26 in such a way as to surround the pressure-receiving liquid chamber 34. The restraint plate 56 serves to limit deformation of the elastic member 26.

The outer cylinder 14 is provided with a notch 58 facing the diaphragm 52. An air space, 62 formed between the diaphragm 52 and the outer cylinder 14, communicates with the outside air through the notch 58.

An explanation of the operation of the embodiment of the present invention is as follows.

The outer cylinder 14 is connected to the chassis of an automobile (not shown). The engine of the automobile is fixed to the inner cylinder 12 through a connecting bar which is not shown. Due to the weight of the automobile engine, the inner cylinder 12 is elastically repositioned so as to move downward relative to the outer cylinder 14 in the state shown in FIG. 1, so that the inner cylinder 12 and the outer cylinder 14 become substantially coaxial. This, however, is only illustrative and the arrangement may be such that the chassis and the engine are fixed to the inner cylinder 12 and the outer cylinder 14, respectively.

Shake vibration of comparatively low frequency, e.g., 10 Hz or so, and comparatively large amplitude, e.g., ±1 mm or so, is generated when, for example, the engine is started. This vibration is applied to the inner cylinder 12 so as to cause the liquid in the pressure-receiving chamber 34 to be displaced towards the second sub-liquid chamber through the second communication passage 46. In this case, the elastic member 44 serving as the expansion and contraction means of the first sub-liquid chamber 42 is not deformed substantially, so that the first sub-liquid chamber 42 expands only slightly. Therefore, no flow of the liquid takes place in the first communication passage 36. In consequence, the liquid in the pressure-receiving chamber 34 resonates in the restricted second passage 46 so as to provide a high attenuation effect thereby damping the shake vibration of the engine.

When the engine idles, vibration occurs at a comparatively high frequency, e.g., 20 to 30 Hz and at a comparatively small amplitude, e.g., ±0.3 mm. In this case, the second communication passage 46 is substantially blocked because the vibration frequency is higher than that of the shake vibration of the engine. Therefore, the liquid in the pressure-receiving chamber 34 causes the elastic member 44 to deform through the first communication passage 36 so as to cause a resonance of liquid between the first sub-liquid chamber 42 and the first passage 35, whereby the dynamic spring constant is lowered to allow absorption of the idle vibration.

Figure 5:
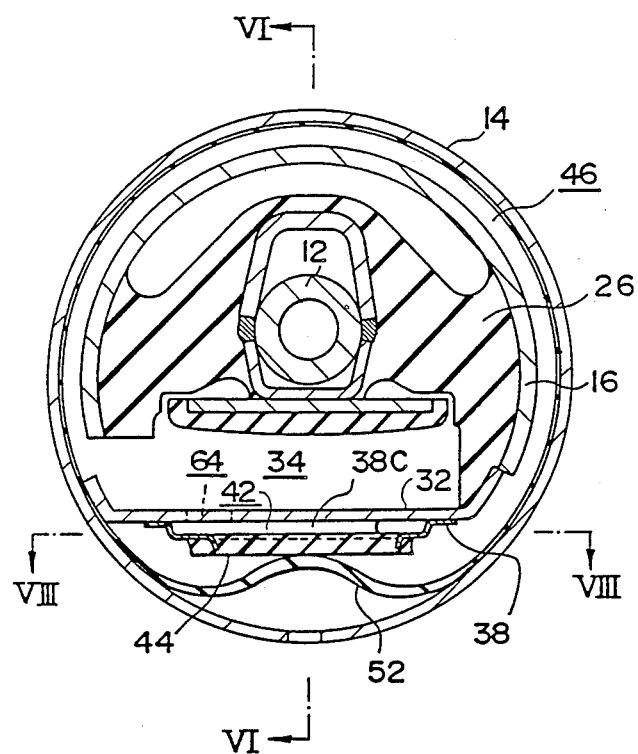
FIG. 5 is a sectional view taken along line V—V of FIG. 6, illustrating a second embodiment of the vibration damping device of the present invention.
Figure 6:
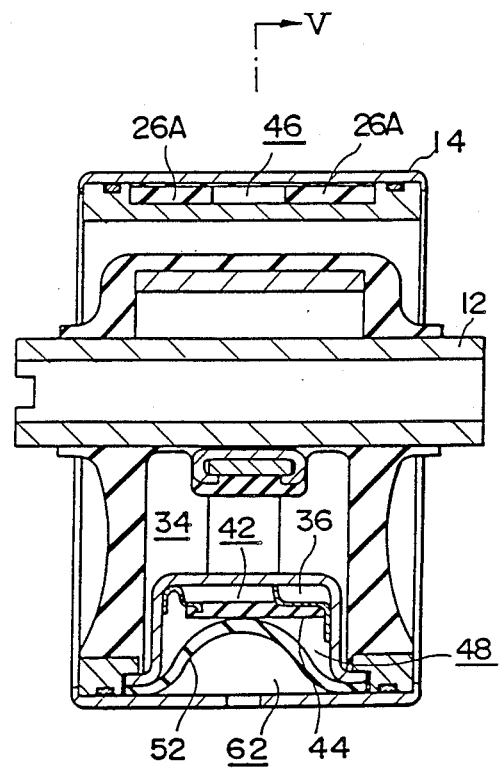
Figure 7:
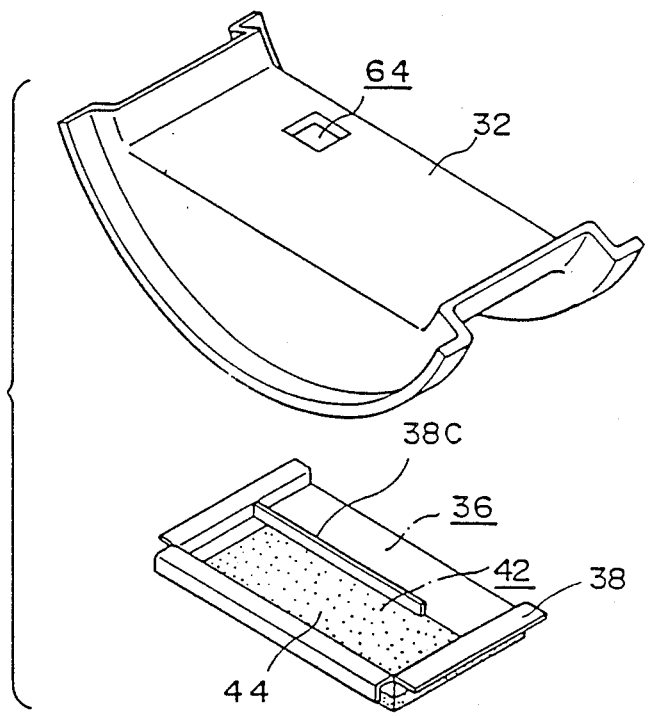
FIG. 7 is a perspective view of a partition plate used in the second embodiment.

FIGS. 5 and 6 show a second embodiment of the present invention.

Figure 8:
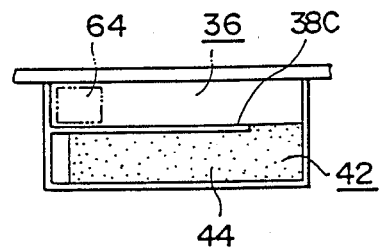
FIG. 8 is a sectional view taken along line VIII—VIII of FIG. 5.

The second embodiment is distinguished from the first embodiment in that the first communication passage 36 is defined by a through-hole 64 formed in the partition plate 32 and an auxiliary passage defined between the partition plate 32 and the partition plate 38. The auxiliary passage is defined between the partition plates 32 and 38 by a bent plate 38C which is fixed to a portion of the partition plate 38. Referring to FIG. 8, the auxiliary passage is defined as being a portion on one side of the bent plate 38C and communicating at its one end with the through-hole 64. This auxiliary passage, serving as a part of the first communication passage 36, communicates with the first sub-liquid chamber 42 facing the elastic member 44, through an end of the bent plate 38C. Thus, the first communication passage 36 does not surround the inner cylinder 12 unlike the first embodiment. Instead, the second communication passage 46, communicating the second sub-liquid chamber 48 to the pressure-receiving chamber 34, surrounds the inner cylinder 12 as in the case of the first embodiment.

Figure 9:
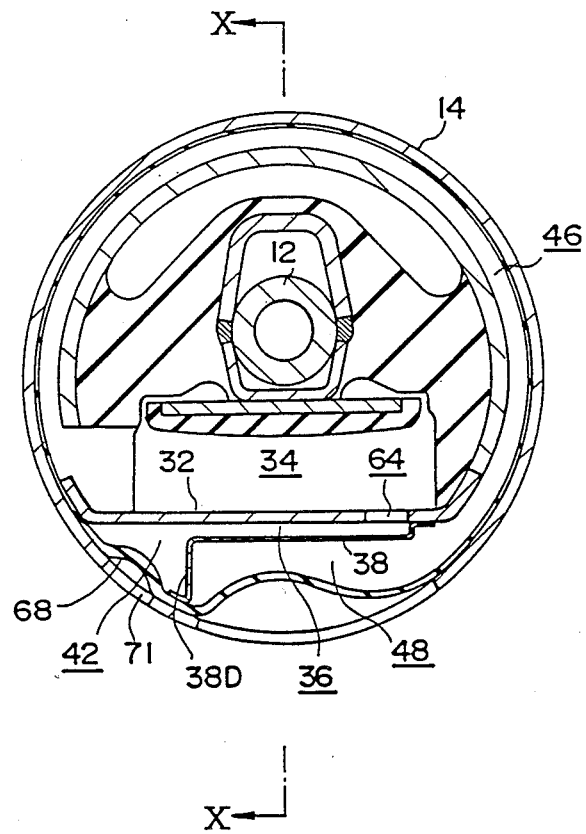
FIG. 9 is a sectional view taken along line IX—IX of FIG. 10, illustrating a third embodiment of the vibration damping device of the present invention.
Figure 10:
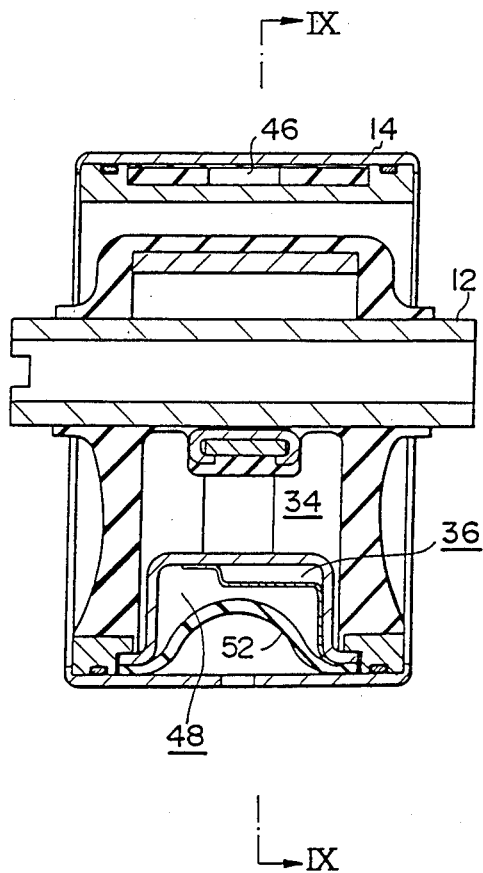
FIG. 10 is a sectional view taken along line X—X of FIG. 9.

A third embodiment of the vibration damping device of the present invention will be described with reference to FIGS. 9 and 10.

In this embodiment, a first communication passage 36, which communicates with the pressure-receiving chamber 34 through a through-hole 64 as in the case of the second embodiment, is formed between the partition plate 32 and the partition plate 38. The first sub-liquid chamber 42, communicating with the first communication passage 36, is defined by the partition plate 32 and a diaphragm 68 which is fixed by vulcanization to a bent end portion 38D of the partition plate 38 and the inner peripheral surface of the outer cylinder 14. The diaphragm 68 is fixed by vulcanization to the periphery of a through-hole 71 formed in the outer cylinder 14 so as to serve as expansion and contraction means for the first sub-liquid chamber 42. In this embodiment also, the first communication passage 36 does not surround the inner cylinder 12. The operation characteristics are therefore similar to those of the second embodiment.

Figure 11:
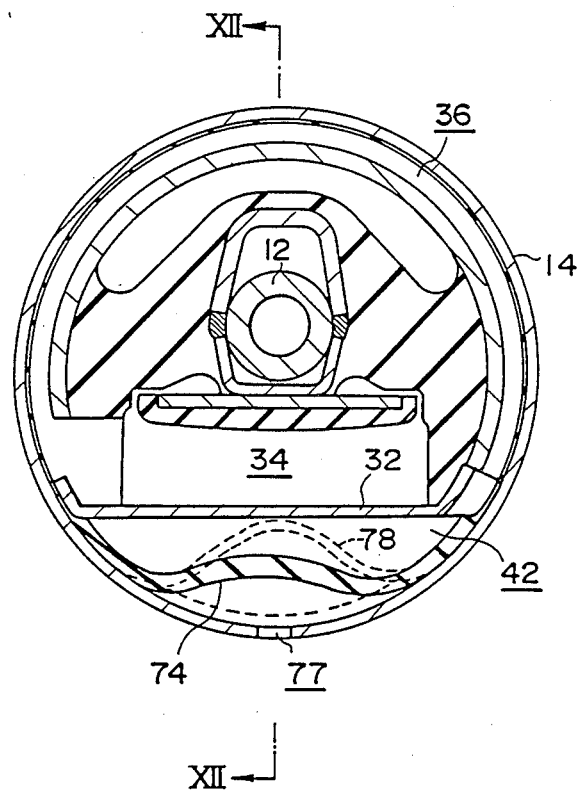
FIG. 11 is a sectional view taken along line XI—XI of FIG. 12, illustrating a fourth embodiment of the vibration damping device of the present invention.
Figure 12:
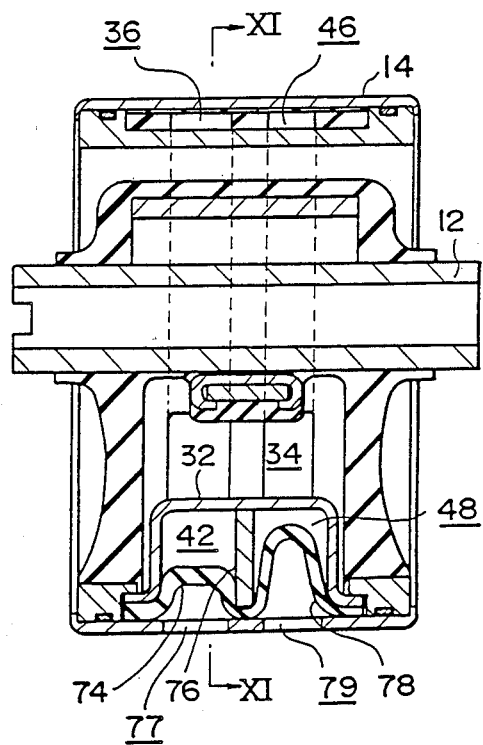
FIG. 12 is a sectional view taken along line XI—XI of FIG. 11.

FIGS. 11 and 12 show a fourth embodiment of the present invention. This embodiment lacks the partition plate 38 used in the first embodiment. Namely, the pressure-receiving liquid chamber 34 communicates with one end of the first communication passage 36 which surrounds the inner sleeve 12 while the other end of the first communication passage 36 is connected to the first sub-liquid chamber 42. The first sub-liquid chamber 42 is formed between the partition plate 32 and a diaphragm 74 which is substantially parallel to the partition plate 32. The second communication passage 46 surrounds the inner cylinder 12 and provides a communication between the pressure-receiving chamber 34 and the second sub-liquid chamber 48.

The second sub-liquid chamber 48 is formed between the partition plate 32 and a disphragm 78 disposed on the outer side of the partition plate 32. The diaphragm is connected at its one end to the diaphragm 74 while the other end is held between the partition plate 32 and the outer cylinder 14.

The diaphragm 78 is also deformable in such a manner as to allow expansion of the second passage 46. A through-hole 79 formed in the outer cylinder 14 facilitates deflection of the diaphragm 78.

Figure 13:
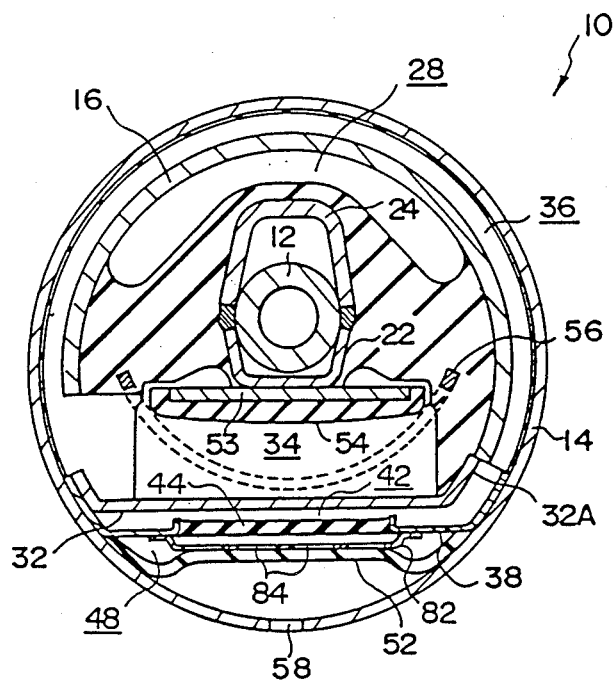
FIGS. 13 and 14 are sectional views of fifth and sixth embodiments of the present invention.

FIG. 13 shows a fifth embodiment which is a modification of the first embodiment shown in FIG. 1. This embodiment features a stopper plate 82 interposed between the elastic member 44 and the diaphragm 52. The stopper plate 82 is disposed in the second sub-liquid chamber 48 and is fixed at its peripheral portion to the partition plate 38. The stopper plate 82 is provided with a multiplicity of through-holes which permit the liquid in the second sub-liquid chamber 48 to move therethrough.

In this embodiment, the degree of deformation of the elastic member 44 and the diaphragm 52 is limited because the elastic member 44 and the diaphragm 52 abut the stopper plate 82 when pressure is increased and decreased in the first and second sub-liquid chambers 42 and 48. In consequence, any excessive deflection of the elastic member 44, which constitutes a part of the wall of the first sub-liquid chamber 42, is limited against vibration at low frequency and large amplitude, thereby producing a large loss.

It will be clear that the feature of the fifth embodiment can be incorporated not only in the first embodiment but also in the second embodiment.

Figure 14:
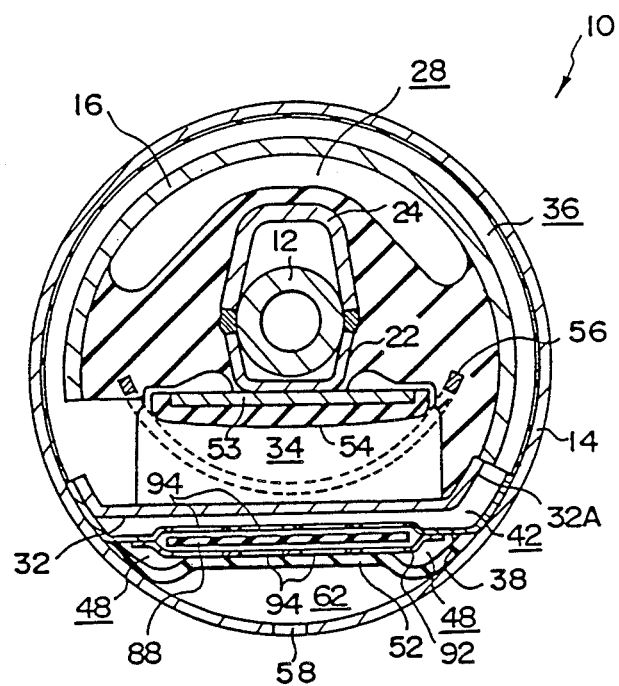

FIG. 14 shows a sixth embodiment of the vibration damping device of the present invention in which the elastic member 44 used in the first embodiment is substituted by a vibration plate 88. The vibration plate 88 is formed of, for example, a thin rubber sheet and is arranged for slight deformation into a space which is formed between the partition plate 38 and an abutment plate 92 which is fixed at its periphery to the partition plate 38. The partition plate 38 and the abutment plate 92 are provided with a plurality of through-holes 94 which permit the liquid to be passed to the vibration plate 88 from the first sub-liquid chamber 42 and the second sub-liquid chamber 48.

In this embodiment, therefore, the vibration plate 88 is held in contact with the partition plate 38 and the abutment plate 92 when a vibration of a low frequency and a large amplitude is applied thereto, so that the vibration is absorbed by the resistance encountered with the liquid flowing through the first communication passage 36 and the second communication passage. On the other hand, vibration of high frequency and low amplitude causes the vibration plate 88 to vibrate slightly so as to change the volume of the pressure-receiving chamber 34 thereby limiting increase in the dynamic spring constant.

The described feature of the sixth embodiment is applicable not only to the first embodiment but also to all other embodiments described hereinbefore.

What is claimed is:

1. A vibration damping device having an inner cylinder and an outer cylinder arranged through the intermediary of an elastic body in such a way that the axes of said cylinders extend in parallel with each other, comprising:
    (a) an expandable and contractable pressure-receiving liquid chamber disposed on one side of said inner cylinder and facing said elastic member;
    (b) first and second sub-liquid chambers provided on the same side of said inner cylinder as said pressure-receiving liquid chamber;
    (c) a first communication passage providing communication between said pressure-receiving liquid chamber and said first sub-liquid chamber;
    (d) a second communication passage providing communication between said pressure-receiving liquid chamber and said second sub-liquid chamber and producing a not smaller resistance than said first communication passage to a liquid flowing therethrough;
    (e) first expansion and contraction means for allowing said first sub-liquid chamber to expand and contract; and
    (f) second expansion and contraction means for allowing said second sub-liquid chamber to expand and contract, said second expansion and contraction means having resistance to pressure not greater than that of said first expansion and contraction means;
    whereby, vibration of a comparatively law frequency and large amplitude is absorbed by the resistance encountered with the liquid flowing through said second communication passage, while vibration of a comparatively high frequency and small amplitude vibration causes a resonance of the liquid in said first communication passage so as not to increase the dynamic spring constant of said vibration damping device.

2. A vibration damping device according to claim 1, wherein said first and second communication passages are arranged to surround said inner cylinder.

3. A vibration damping device according to claim 1, wherein said second communication passage surrounds said inner cylinder.

4. A vibration damping device according to claim 1, wherein said pressure-receiving liquid chamber is disposed in the vicinity of said inner cylinder, while said first and second sub-liquid chambers are disposed on the radially outer side of said pressure-receiving liquid chamber.

5. A vibration damping device according to claim 2, wherein said first and second communication passages are curved at an equal radius of curvature and have different cross-sectional areas.

6. A vibration damping device according to claim 1, wherein said first and second sub-liquid chambers are separated from each other by an elastic member.

7. A vibration damping device according to claim 6, wherein an elastic member for allowing expansion and contraction of said second sub-liquid chamber is more easily deformable than said elastic member which separates said first and second sub-liquid chambers from each other.

8. A vibration damping device according to claim 1, wherein said pressure-receiving chamber and said first sub-liquid chamber are separated from each other by a plate member fixed in said elastic member.

9. A vibration damping device according to claim 1, wherein said first and second communication passages surround an intermediate cylinder which is fixed to said outer cylinder coaxially therewith.

10. A vibration damping device having an inner cylinder and an outer cylinder arranged through the intermediary of an elastic member in such a way that the axes of said cylinders extend in parallel with each other, comprising:
   (a) a pressure-receiving chamber disposed between said inner cylinder and said outer cylinder;
   (b) a first sub-liquid chamber disposed on the outer side of said pressure-receiving chamber;
   (c) an expandable and contractable second sub-liquid chamber disposed on the outer side of said first sub-liquid chamber;
   (d) expansion and contraction means for allowing expansion and contraction of said first sub-liquid chamber, said expansion and contracting means having a greater resistance to pressure than said second sub-liquid chamber;
   (e) a first communication passage providing communication between said pressure-receiving liquid chamber and said first sub-liquid chamber; and
   (f) a second communication passage surrounding said inner cylinder and providing communication between said pressure-receiving liquid chamber and said second sub-liquid chamber, said second communication passage providing a greater resistance than said first communication passage to a liquid flowing therethrough.

11. A vibration damping device according to claim 10, wherein said first communication passage surrounds said inner cylinder.

12. A vibration damping device according to claim 11, wherein said first and second communication passages surround said inner cylinder at an equal radius of curvature and have different cross-sectional areas for passage of a liquid.

13. A vibration damping device according to claim 10, wherein said pressure-receiving chamber and said first sub-liquid chambers are separated from each other through a thin-walled plate member.

14. A vibration damping device according to claim 13, wherein said first communication passage is formed so as to penetrate said thin-walled plate member.

15. A vibration damping device according to claim 10, wherein said first and second sub-liquid chambers are separated from each other by an elastic diaphragm.

16. A vibration damping device according to claim 15, wherein a part of the wall defining said second sub-liquid chamber is made of an elastic diaphragm thinner than said elastic diaphragm separating said first and second sub-liquid chambers.

17. A vibration damping device according to claim 10, wherein said first and second sub-liquid chambers communicate with each other via a small chamber which communicates with said sub-liquid chambers through a multiplicity of small holes, said small chamber accommodating a thin-walled vibration plate, aid vibration plate being held in contact with the wall of said small chamber in response to a vibration of a low frequency and a large amplitude so as to disconnect both sub-liquid chambers from each other, whereas, when vibration of a high frequency and a low amplitude is applied, said vibration plate finely vibrates so as to prevent increase in the dynamic spring constant of said vibration damping device.

18. A vibration damping device arranged between a vibration source and a part to be isolated from the vibration, comprising:
   (a) an inner cylinder connected to one of said vibration source and said part;
   (b) an outer cylinder connected to the other of said vibration source and said part and arranged in parallel with said inner cylinder;
   (c) an elastic body member through which said inner and outer cylinders are connected to each other;
   (d) a pressure-receiving chamber formed in said elastic member at one side of said inner cylinder and capable of expanding and contracting in response to vibration;
   (e) a first sub-liquid chamber disposed between said pressure-receiving chamber and said outer cylinder and capable of expanding and contracting;
   (f) a second sub-liquid chamber provided between said first sub-liquid chamber and said outer cylinder and capable of expanding and contracting;
   (g) a first communication passage providing communication between said pressure-receiving chamber and said first sub-liquid chamber;
   (h) a second communication passage providing communication between said pressure-receiving liquid chamber and said second sub-liquid chamber and producing a not smaller flow resistance than said first communication passage to a liquid flowing therethrough; and
   (i) expansion and contraction means for enabling said first sub-liquid chamber to have a greater resistance to pressure than said second sub-liquid chamber.

19. A vibration damping device according to claim 18, wherein said first and second communication passages surround said inner cylinder.

20. A vibration damping device according to claim 18, wherein said first and second sub-liquid chambers are separated from each other by a first thin-walled elastic member, said second sub-liquid chamber being defined by a second thin-walled elastic member facing ambient air, said first thin-walled elastic member has a greater resistance to deformation by pressure than said second thin-walled elastic member.

* * * * *